(12) United States Patent
Prasad et al.

(10) Patent No.: US 9,637,654 B2
(45) Date of Patent: May 2, 2017

(54) INK COMPOSITION

(75) Inventors: Keshava A. Prasad, San Marcos, CA (US); Xiaohe Chen, San Diego, CA (US); Fereshteh Khorrami, San Diego, CA (US); Yi-Hua Tsao, San Diego, CA (US); Dennis Z. Guo, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 14/349,048

(22) PCT Filed: Oct. 25, 2011

(86) PCT No.: PCT/US2011/057665
§ 371 (c)(1),
(2), (4) Date: Apr. 1, 2014

(87) PCT Pub. No.: WO2013/062529
PCT Pub. Date: May 2, 2013

(65) Prior Publication Data
US 2014/0300673 A1    Oct. 9, 2014

(51) Int. Cl.
*C09D 11/38* (2014.01)
*C09D 11/54* (2014.01)

(52) U.S. Cl.
CPC .............. *C09D 11/38* (2013.01); *C09D 11/54* (2013.01)

(58) Field of Classification Search
CPC ........................... C09D 11/005; C09D 11/54
See application file for complete search history.

(56) References Cited

U.S. PATENT DOCUMENTS

| | | | |
|---|---|---|---|
| 5,416,145 | A | 5/1995 | Askeland et al. |
| 5,792,249 | A | 8/1998 | Shirota et al. |
| 6,398,329 | B1 * | 6/2002 | Boyd ................ B41J 2/14153 347/7 |
| 6,740,689 | B1 * | 5/2004 | Lee ..................... B41J 2/2114 523/160 |
| 6,908,185 | B2 | 6/2005 | Chen et al. |
| 7,018,459 | B2 * | 3/2006 | Doi ..................... C09D 11/30 106/31.6 |
| 7,119,133 | B2 | 10/2006 | Vincent et al. |
| 7,303,616 | B2 | 12/2007 | Oki et al. |
| 7,393,397 | B2 | 7/2008 | Ham |
| 7,459,491 | B2 | 12/2008 | Tyvoll et al. |
| 8,133,934 | B2 | 3/2012 | Liu et al. |
| 8,182,597 | B2 | 5/2012 | Robertson et al. |
| 8,974,049 | B2 * | 3/2015 | Prasad .................... 347/100 |
| 2002/0185033 | A1 | 12/2002 | Shepard |
| 2003/0029355 | A1 | 2/2003 | Miyabayashi |
| 2003/0050362 | A1 | 3/2003 | Sakai et al. |
| 2003/0101904 | A1 | 6/2003 | Morris et al. |
| 2004/0186200 | A1 | 9/2004 | Yatake |
| 2004/0257418 | A1 | 12/2004 | Doi |
| 2005/0075416 | A1 | 4/2005 | Miyabayashi |
| 2005/0090582 | A1 | 4/2005 | Ushirogouchi et al. |
| 2005/0142306 | A1 | 6/2005 | Uhlir-Tsang et al. |
| 2006/0211791 | A1 | 9/2006 | Burns et al. |
| 2006/0233976 | A1 | 10/2006 | Uhlir-Tsang et al. |
| 2007/0098927 | A1 | 5/2007 | Uhlir-Tsang et al. |
| 2008/0026221 | A1 | 1/2008 | Vincent et al. |
| 2008/0043079 | A1 | 2/2008 | Ikeda et al. |
| 2008/0146729 | A1 | 6/2008 | Yatake |
| 2010/0104756 | A1 | 4/2010 | Nagano |
| 2012/0176443 | A1 | 7/2012 | Robertson et al. |
| 2012/0249623 | A1 | 10/2012 | Vasudevan et al. |

FOREIGN PATENT DOCUMENTS

| | | | |
|---|---|---|---|
| CN | 101052690 | | 10/2007 |
| CN | 101426657 | | 5/2009 |
| EP | 1142968 | | 10/2001 |
| EP | 1715011 | | 10/2006 |
| JP | 2004123904 | | 4/2004 |
| WO | WO-2004065475 | | 8/2004 |
| WO | WO-2005095531 | | 10/2005 |
| WO | WO2006036367 | | 4/2006 |
| WO | WO-2006041658 | | 4/2006 |
| WO | WO 2011099977 | A1 * | 8/2011 ............. C09D 11/30 |

OTHER PUBLICATIONS

Abstract for JP2007-197525 published Aug. 9, 2007.*
Abstract for CN 1506153 published Jun. 23, 2004.*
"HP Business Inkjet 2200-2250 User's Guide", Hewlett-Packard Company, (2000), 81 pages.
Yang, Q, et al. "Preparation of polymer-grafted carbon black nanoparticles by surface-initiated atom transfer radical polymerization" Jrnl. of Polymer Sci. Part A; vol. 45 2007.

* cited by examiner

*Primary Examiner* — Gerard Higgins
(74) *Attorney, Agent, or Firm* — Dierker & Kavanaugh, P.C.

(57) ABSTRACT

An ink composition is disclosed herein. The ink composition includes from about 5 wt % to about 25 wt % of a co-solvent; from about 0.025 wt % to about 0.2 wt % of i) a chelating agent represented by formula 1, wherein R' is a carboxylic acid functional group or a carboxylate salt functional group and n>2; ii) a chelating agent represented by formula 2:, wherein R is a carboxylic acid functional group or a carboxylate salt functional group, m is greater than or equal to 1, x is greater than or equal to 2, y is greater than or equal to 1, and z is greater than or equal to 2; iii) a chelating agent represented by formula 3, wherein any of r, s, t, or u is a sulfonic acid functional group or a sulfonate functional group; or iv) combinations of any of i, ii, and iii. The ink composition also includes a balance of water.

14 Claims, 1 Drawing Sheet

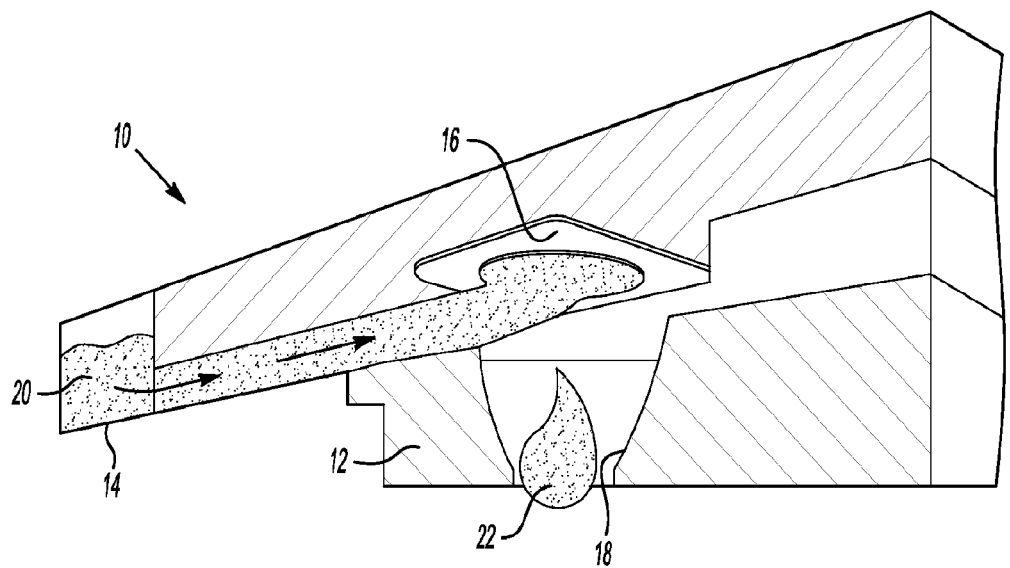

INK COMPOSITION

BACKGROUND

The present disclosure relates generally to ink compositions.

Inkjet printing or recording systems are commonly used as an effective way to produce images on a print medium, such as paper. Generally, ink droplets are ejected from a nozzle at high speed by the inkjet recording system and onto the print medium to produce an image thereon. Thermal inkjet printing involves passing a pulse of current through a heating element, which causes a rapid vaporization of ink in a chamber to form a bubble. This results in a large pressure increase, which propels a droplet of ink onto the print medium. During the firing of a drop, a layer of ink covering the surface of the heating element can reach high temperatures, e.g., about 340° C. At this temperature, the ink may decompose and deposit residue on the surface of the heating element. This process is known as kogation. Kogation may deleteriously affect the volume, shape, and/or velocity of the ejected drop, which may cause the quality of the printed output to vary.

BRIEF DESCRIPTION OF THE DRAWING

Features and advantages of examples of the present disclosure will become apparent by reference to the following detailed description and drawing.

FIG. 1 is a cut-away, perspective semi-schematic illustration of an example of an ink cartridge including an example of the ink composition disclosed herein.

DETAILED DESCRIPTION

Examples of the ink composition disclosed herein include specific chelating agent(s), such as chelating agents having two or more nitrogen atoms and four or more carboxylic acid functional groups or carboxylate salt functional groups, or catechol chelating agents. The ink composition may be formulated as a colored ink that is to be printed on a medium to form text, images, graphics, etc. thereon. The ink composition may also be formulated as a colorless fixer that is to be printed on a medium prior to a colored ink. When used as a colorless fixer, examples of the ink composition disclosed herein crash the subsequently printed colorant on the media surface to maintain consistent and desirable print quality.

The addition of the specific chelating agent(s) to the example ink composition(s) advantageously helps the ink composition(s) to resist decomposition over the useful life of the print cartridge(s) from which the ink composition(s) is/are dispensed. As such, examples of the ink composition disclosed herein increase the print cartridge life, at least in part by slowing down or even preventing the rate of buildup of thermally decomposed (i.e., kogated) ink components on the surface of the heating element. Depending upon the ink cartridge that is utilized, the useful life of the print cartridge may be up to, and in some instances higher than, 1 billion drops per nozzle.

The addition of the chelating agent(s) to examples of the ink composition does not deleteriously impact decap performance, and in some instances may improve decap performance. The term "decap," as referred to herein, means the ability of the inkjet ink to readily eject from the print head, upon prolonged exposure to air. The decap time is measured as the amount of time that a print head may be left uncapped before the printer nozzles no longer fire properly, potentially because of clogging or plugging. Nozzle(s) may become clogged/plugged by a viscous plug that forms in the nozzle(s) as a result of water loss, crusting of the ink, and/or crystallization of the colorant in and/or around any of the nozzles. If a nozzle has plugged, ink droplets ejected through the nozzle's orifice may be misdirected, which may adversely affect print quality. The orifice may also become completely blocked, and as a result, the ink droplets may not pass through the affected nozzle. As will be described further, the ink composition(s) disclosed herein including the chelating agent(s) have comparable or improved decap performance when compared, for example, to ink compositions that do not include such chelating agent(s).

Whether formulated as the colored ink or the colorless fixer, examples of the ink composition disclosed herein include a co-solvent; any of the chelating agents disclosed herein; and a balance of water.

The co-solvent selected depends, at least in part, upon the other components in the ink composition. Examples of co-solvents that are suitable for the colored ink composition or the fixer ink composition include di-(2-hydroxyethyl)-5,5-dimethylhydantoin; 2-hydroxyethyl-2-pyrrollidinone; 2-pyrrollidinone; glycerol polyoxyethyl ether; tripropylene glycol; triethylene glycol; tetraethylene glycol; 1-(2-hydroxyethyl)-2-imidazolidinone; 1,2,6-hexanetriol; trimethylolpropane; glycerol; 2-hydroxyethyl-2-methyl-1,3-propanediol; or combinations thereof.

As examples, a magenta or yellow ink composition includes di-(2-hydroxyethyl)-5,5-dimethylhydantoin and 2-hydroxyethyl-2-pyrrollidinone as co-solvents; another magenta ink composition includes 2-pyrrollidinone, triethylene glycol, and di-(2-hydroxyethyl)-5,5-dimethylhydantoin as co-solvents; another yellow ink composition includes tripropylene glycol and tetraethylene glycol as co-solvents; and a fixer ink composition includes tetraethylene glycol alone as a co-solvent.

In an example, the total amount of co-solvent(s) utilized in the ink composition ranges from about 5 wt % to about 25 wt % of the total wt % of the ink composition. In an example of the colored ink composition, the total amount of co-solvent(s) ranges from about 9.5 wt % to about 22 wt %. In an example of the fixer ink composition, the total amount of co-solvent(s) ranges from about 10 wt % to about 15 wt %.

Some examples of the ink composition(s) disclosed herein include a chelating agent that contains two or more nitrogen atoms and four or more carboxylic acid functional groups (COOH) or carboxylate salt functional groups (COO⁻ in the presence of a metal cation). These chelating agents are represented by either formula 1 or formula 2. Formula 1 is:

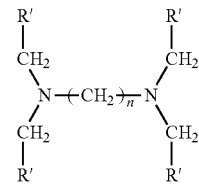

where R' is a carboxylic acid functional group or a carboxylate salt functional group and n>2. An example of the chelating agent represented by formula 1 has R'=a carboxylic acid functional group and n=3, and is known as N,N'-1,3-propanediylbis[N-(carboxymethyl)-glycine (also known as 1,3-propanediamine-N,N,N',N'-tetraacetic acid). Formula 2 is:

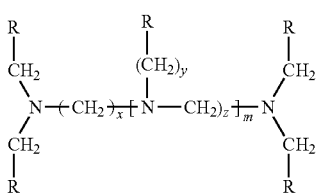

where R is a carboxylic acid functional group or a carboxylate salt functional group, m≥1, x≥2, y≥1, and z≥2. An example of the chelating agent represented by formula 2 has R=a carboxylic acid functional group, m=1, x=2, y=1, and z=2, and is known as diethylenetriaminepentaacetic acid (DTPA).

Some other examples of the ink composition(s) disclosed herein include a chelating agent that is a catechol. This chelating agent is represented by formula 3:

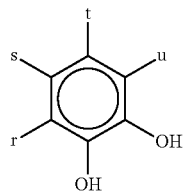

where r, s, t, and/or u is a sulfonic acid functional group or a sulfonate functional group. In other words, at least one of r, s, t, or u is $SO_3H$, or $SO_3^-$ in the presence of a metal cation. Other groups suitable for r, s, t, and/or u include hydrogen atoms, hydroxyl functional groups, or carboxylate functional groups. An example of the chelating agent represented by formula 3 has r=H, s=$SO_3H$, t=H, and u=$SO_3H$, includes two sodium atoms and water, and is known as 4,5-dihydroxy-1,3-benzenedisulfonic acid, disodium salt or Tiron (available from TCI America, Portland, Oreg.).

The chelating agents may be used alone or in any combination. For example, a chelating agent represented by formula 1 may be mixed with a chelating agent represented by formula 2 or formula 3, or a chelating agent represented by formula 2 may be mixed with a chelating agent represented by formula 3, or a chelating agent represented by formula 1 may be mixed with a chelating agent represented by formula 2 and a chelating agent represented by formula 3. Whether a single chelating agent is utilized or a combination of two or more chelating agents is utilized, the total amount of that chelating agent(s) ranges from about 0.025 wt % to about 0.2 wt %.

As mentioned above, the selected chelating agent(s) are believed to improve kogation without having a deleterious impact on decap performance, and at least in some instances, improve kogation while also improving decap performance.

The balance (up to 100 wt %) of the ink composition is made up of water.

When formulated as the colored ink, in addition to the co-solvent(s), the chelating agent(s), and the water, the ink composition also includes a colorant. The colorant may include a water-soluble dye, a self-dispersed pigment, a pigment dispersed by polymeric dispersant(s), or a combination thereof. Some examples of suitable water-soluble dyes include acid dyes, direct dyes and copper phthalocyanine dyes. Some examples of self-dispersed pigment dispersions include the CAB-O-JET® 200, 300 and 400 series (from Cabot Corp., Boston, Mass.). For examples including pigments that are dispersed by polymeric dispersant(s), the polymeric dispersant contains a polymer with an acid number ranging from about 100 to about 250 and including a dispersing polymer with a weight average molecular weight ranging from about 5000 to about 20000. In an example, the pigment dispersion is a magenta pigment with a styrene acrylate dispersant, similar to, for example, PR 122, PR 282, PR 269 and PR150. In another example, the pigment dispersion contains a yellow pigment, such as PY 74, PY 155 and PY128, dispersed similarly to the previously mentioned magenta dispersions. Pigment dispersions of other colors, aside from magenta and yellow, are within the scope of the present disclosure as long as they have similar dispersing polymer(s). In an example, the amount of colorant utilized in the colored ink composition ranges from about 0.5 wt % to about 6 wt % of the total wt % of the colored ink composition. In another example, the amount of colorant utilized in the ink composition ranges from about 3 wt % to about 5 wt % of the total wt % of the colored ink composition.

Examples of the colored ink composition may also include a non-ionic surfactant and/or a biocide.

When a non-ionic surfactant is utilized in the colored ink composition, a suitable amount of the non-ionic surfactant may range from about 0.1 wt % to about 2 wt %. Examples of suitable non-ionic surfactants include those based upon acetylenic diol chemistry (e.g., SURFYNOL® SE-F and SURFYNOL® 440, available from Air Products and Chemicals, Inc., Allentown, Pa.), fluorosurfactants, dodecyl-2-pyrrolidone, and secondary alcohol ethoxylates (e.g., TERGITOL™ 15-S-7 and TERGITOL™ 15-S-9m available from The Dow Chemical Co., Midland, Mich.).

When a biocide is utilized in the colored ink composition, a suitable amount of the biocide may range from about 0.05 wt % to about 0.5 wt %. If multiple biocides are utilized, the total amount is equal to or less than 0.5 wt %. It is to be understood that the upper limit for the individual biocide may depend upon the type of biocide and its toxicological effect and/or regulatory requirements. For example, the upper limit for PROXEL™ GXL (Arch Chemicals, Inc., Norwalk, Conn.) is 0.2 wt %. Suitable biocides include, for example, PROXEL™ GXL, KORDEK™ MLX (Dow Chemical Co., Midland, Mich.), and/or BIOBAN™ CS-1246 (Dow Chemical Co.).

Examples of the colored ink composition disclosed herein may also include, in some instances, other additives, such as a polyurethane binder, ethoxylated glycerol and/or an alkyl phosphate ester.

When a polyurethane binder is utilized, a suitable amount of the binder may be up to about 3 wt %. In the examples disclosed herein, the polyurethane binder has an acid number ranging from 20 to 59, and a weight average molecular weight ranging from about 20000 to about 50000. In an example, the polyurethane binder has an acid number of 55 and a weight average molecular weight of about 42000. It is to be understood that the co-solvent(s) used and the amount of co-solvent(s) used may depend, at least in part, upon whether the polyurethane binder is included in the colored ink composition. As an example, the co-solvent may be selected in order to aid in dispersing the polyurethane binder throughout the colored ink composition. As another example, the amount of polyurethane binder used may have a deleterious effect on the decap performance, and the co-solvent(s) may be selected to counteract this deleterious effect. In some examples that include the polyurethane binder, two co-solvents may be used, such as di-(2-hydroxyethyl)-5,5-dimethylhydantoin and 2-hydroxyethyl-2-pyrrollidinone, or tetraethylene glycol and tripropylene glycol. In some other examples that include the polyurethane binder, three co-solvents may be used, such as di-(2-hydroxyethyl)-5,5-dimethylhydantoin, 2-pyrrollidinone and triethylene glycol.

In the colored ink compositions disclosed herein, the selected chelating agent(s) may be used in combination with or in place of ethoxylated glycerol (e.g., LIPONIC™ EG-1, Lipo Chemicals, Inc., Paterson, N.J.). As will be shown in the Examples, the use of ethoxylated glycerol alone is not as effective in preventing kogation when compared to the example colored ink compositions disclosed herein (see Examples 2 and 3). This is particularly true when the print cartridge useful life is equal to or greater than 350 million drops per nozzle fired. The ethoxylated glycerol may be present in examples of the colored ink composition in an amount up to about 1 wt %.

Examples of the colored ink composition disclosed herein may also include an alkyl phosphate ester, which is believed to contribute to the reduction or elimination of kogation. This component may be present in the colored ink composition in an amount up to about 1 wt % of the total wt % of the ink composition. Some examples of suitable alkyl phosphate esters include those that are commercially available from Croda, Inc., Edison, N.J., such as CRODAFOS™ O3A (formerly the CRODAFOS™ N3 product series, including the acid form) or CRODAFOS™ O3A-LQ-(MH).

When formulated as the fixer, the ink composition is colorless and thus specifically excludes a colorant. However, when formulated as the fixer, in addition to the co-solvent(s), the chelating agent(s), and the water, the ink composition also includes calcium propionate, methanesulfonic acid, a non-ionic surfactant, and/or a biocide.

In an example of the fixer ink composition disclosed herein, calcium propionate may be used in an amount ranging from about 3 wt % to about 10 wt %, and methanesulfonic acid may be used in an amount ranging from about 0.5 wt % to about 4 wt %. Calcium propionate is a fixing agent, which is used to immobilize colorant.

When a non-ionic surfactant is utilized in the fixer ink composition, a suitable amount of the non-ionic surfactant may range from about 0.3 wt % to about 2 wt %. Examples of suitable non-ionic surfactants include those based upon acetylenic diol chemistry (e.g., SURFYNOL® SE-F and SURFYNOL® 440, available from Air Products and Chemicals, Inc., Allentown, Pa.), fluorosurfactants, and secondary alcohol ethoxylates (e.g., TERGITOL™ 15-S-30, TERGITOL™ 15-S-7 and TERGITOL™ 15-S-9m available from The Dow Chemical Co., Midland, Mich.).

When a biocide is utilized in the fixer ink composition, a suitable amount of the biocide may range from about 0.05 wt % to about 0.6 wt %. If multiple biocides are utilized, the total amount is equal to or less than 0.6 wt %. As mentioned above, the upper limit for any individual biocide may depend upon the type of biocide and its toxicological effect and/or regulatory requirements (e.g., the upper limit for PROXEL™ GXL is 0.2 wt %). Suitable biocides for the fixer ink composition include, for example, PROXEL™ GXL, KORDEK™ MLX, and/or BIOBAN™ CS-1246.

For thermal inkjet printing using pigmented ink, it may be desirable that the ink composition (whether formulated as the colored ink composition or as the fixer ink composition) have a basic pH, ranging anywhere from greater than 7 to 12. When the initial pH of the resulting pigmented ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Examples of suitable bases include NaOH or KOH. The amount of base added will depend, at least in part, on the initial pH of the ink composition and the desired final pH of the ink composition. In an example, the pH is adjusted to about 9, and a suitable amount of base is added until this pH is obtained. When adding the base to the ink composition, the pH may be tested in order to determine if the desired pH has been obtained. In other examples, it may be desirable that the ink composition have an acidic pH (below 7). This may be particularly desirable when the ink composition is used as a fixer. The pH may be adjusted using any desirable acid, such as methanesulfonic acid. When adding the acid to the ink composition, the pH may be tested in order to determine if the desired pH has been obtained.

The colored ink composition(s) and fixer ink composition(s) disclosed herein may be suitable for use in various printing processes, including high speed printing processes. In an example, the colored and/or fixer ink composition(s) may be used in web press printers that print more than 1 meter per second. A cut-away, perspective semi-schematic view of an example of a print cartridge 10 that may be used, e.g., in a web press printer is shown in FIG. 1. The print cartridge 10 includes a housing 12 (which may include one or more layers of different materials) that is operatively connected to a reservoir 14 that contains an example of the ink composition 20 disclosed herein. A fluid path connects the reservoir 14 to a fluid ejector 16. In a thermal inkjet print cartridge 10, the fluid ejector 16 is a heating element that creates heat to vaporize the ink composition 20, which creates a bubble that expands to push the ink composition 20 (in the form of drops 22) out of a nozzle 18 that is aligned with the fluid ejector 16. While a single fluid ejector 16 and nozzle 18 is shown, it is to be understood that a single print cartridge 10 may include multiple (e.g., 400 or some other desirable number) fluid ejectors 16 and nozzles 18. While not shown, it is to be understood that the print cartridge 10 includes an integrated circuit that routes signals (e.g., from a processor that is capable of running suitable computer readable instructions) to the desirable fluid ejector(s) 16 and nozzle(s) 18 for firing ink drops 22 therefrom to produce a layer of fixer and/or images on a desirable medium.

When used with high speed printers, the colored and/or ink composition(s) disclosed herein provide substantially consistent print quality (i.e., ≤20% change in drop velocity and drop weight, and in some instances ≤10% change in drop velocity and drop weight) over the life of the print cartridge 10. The ink composition(s) disclosed herein may also maintain suitable decap performance in high speed printers, where the number of spits per nozzle at a given frequency maintains nozzle health of idle nozzles during printing.

To further illustrate the present disclosure, examples are given herein. It is to be understood that these examples are provided for illustrative purposes and are not to be construed as limiting the scope of the disclosed example(s).

In the examples disclosed herein, to obtain consistent print quality over the life of the pen/cartridge, it is desirable to have a % change in drop velocity and a % change in drop weight each be equal to or less than 10% (in either the positive or negative direction). A % change in drop velocity and a % change in drop weight that are each between 10% and 20% are less desirable, but may still result in consistent print quality. An ink composition that results in a % change in drop velocity and/or a % change in drop weight that is over 20% is deemed undesirable (even if the other % change is less than 20%).

EXAMPLE 1

Fixer ink compositions were prepared with 4,5-dihydroxy-1,3-benzenedisulfonic acid, disodium salt as the selected chelating agent. A comparative fixer ink composition was prepared without 4,5-dihydroxy-1,3-benzenedisulfonic acid, disodium salt. The formulations of the sample fixer ink compositions and the comparative fixer ink composition are shown in Table 1.

TABLE 1

Fixer Ink Composition Formulations

| Component | Comp. Fixer Sample Wt % | Fixer Sample 1 Wt % | Fixer Sample 2 Wt % | Fixer Sample 3 Wt % |
|---|---|---|---|---|
| 4,5-dihydroxy-1,3-benzenedisulfonic acid, disodium salt | None | 0.05 | 0.10 | 0.15 |
| Calcium propionate | 6.50 | 6.50 | 6.50 | 6.50 |
| Tetraethylene glycol | 12.00 | 12.00 | 12.00 | 12.00 |
| TERGITOL ™ 15-S-30 (The Dow Chemical Co.) | 0.30 | 0.30 | 0.30 | 0.30 |
| Methanesulfonic Acid | 1.50 | 1.50 | 1.50 | 1.50 |
| BIOBAN ™ CS-1246 (The Dow Chemical Co.) | 0.19 | 0.19 | 0.19 | 0.19 |
| PROXEL ™ GXL (The Dow Chemical Co.) | 0.24 | 0.24 | 0.24 | 0.24 |
| KORDEK ™ MLX (The Dow Chemical Co.) | 0.15 | 0.15 | 0.15 | 0.15 |
| Water | Balance to 100 wt % | Balance to 100 wt % | Balance to 100 wt % | Balance to 100 wt % |
| pH (adjusted with methanesulfonic acid | 6 | 6 | 6 | 6 |

Each of the comparative fixer sample and fixer samples 1-3 were filled into a thermal inkjet pen/cartridge (Hewlett-Packard HP38 pens), and were continuously fired on a pen/cartridge life test apparatus for the life of the pen/cartridge. For this test, no media was used. Rather, the pen/cartridge life test apparatus exercised the pen/cartridge, and the fixer drops were ejected into a spittoon. At certain intervals and at the end of the pen/cartridge life (up to 1 billion drops per nozzle), the pen/cartridge drop velocity and drop weight were monitored. Table 2 illustrates the % change in drop velocity and the % change in drop weight at the end of 1 billion drops.

TABLE 2

% Change in Drop Velocity and Drop Weight

| Formulation | % Change in Drop Weight @ 1 billion drops | % Change in Drop Velocity @ 1 billion drops |
|---|---|---|
| Comp. Fixer Sample | −54 | −59 |
| Fixer Sample 1 | −5 | −11 |
| Fixer Sample 2 | −6 | −15 |
| Fixer Sample 3 | −6 | −14 |

Based upon the drop velocity data and the drop weight data taken immediately after the test was performed, fixer samples 1-3 (containing, respectively, 0.05 wt %, 0.1 wt %, and 0.15 wt % of 4,5-dihydroxy-1,3-benzenedisulfonic acid, disodium salt) were more desirable and effectively reduced kogation. Fixer samples 1-3 each exhibited a desirable equal to or less than 15% change in both drop velocity and drop weight, with the change in drop weight values being particularly low. The same data collected for the comparative fixer sample indicated that the comparative sample was poor. Overall, the data from Example 1 illustrates that a chelating agent including sulfonate functional groups is suitable for reducing kogation of fixer ink compositions over the life of the pen/cartridge, and is more effective than a similar comparative fixer composition that does not include the chelating agent.

EXAMPLE 2

Magenta colored ink compositions were prepared with either N,N'-1,3-propanediylbis[N-(carboxymethyl)-glycine or diethylenetriaminepentaacetic acid as the selected chelating agent. A comparative magenta ink composition was prepared without the chelating agents. The formulations of the sample magenta ink compositions and the comparative magenta ink composition are shown in Table 3.

TABLE 3

Magenta Ink Composition Formulations

| Component | Comp. Magenta Sample Wt % | Magenta Sample 1 Wt % | Magenta Sample 2 Wt % | Magenta Sample 3 Wt % |
|---|---|---|---|---|
| N,N'-1,3-propanediylbis [N-(carboxymethyl)-glycine | None | None | None | 0.055 |
| diethylenetriamine-pentaacetic acid | None | 0.055 | 0.075 | None |
| di-(2-hydroxyethyl)-5,5-dimethylhydantoin | 8.00 | 8.00 | 8.00 | 8.00 |
| 2-hydroxyethyl-2-pyrrollidinone | 1.50 | 1.50 | 1.50 | 1.50 |
| LIPONIC ™ EG-1 (Lipo Chemicals, Inc.) | 0.50 | None | None | None |
| SURFYNOL ® SE-F (Air Products and Chemicals, Inc.) | 0.65 | 0.65 | 0.65 | 0.65 |
| CRODAFOS ™ N3, acid form (Croda, Inc.) | 0.75 | 0.75 | 0.75 | 0.75 |
| Polyurethane binder | 0.75 | 0.75 | 0.75 | 0.75 |
| Magenta Pigment Styrene Acrylate Dispersion | 3.50 | 3.50 | 3.50 | 3.50 |
| PROXEL ™ GXL (The Dow Chemical Co.) | 0.18 | 0.18 | 0.18 | 0.18 |
| KORDEK ™ MLX (The Dow Chemical Co.) | 0.14 | 0.14 | 0.14 | 0.14 |
| Water | Balance to 100 wt % | Balance to 100 wt % | Balance to 100 wt % | Balance to 100 wt % |
| pH (adjusted with KOH) | 9.2 | 9.2 | 9.2 | 9.2 |

Each of the comparative magenta ink sample and magenta ink samples 1-3 were filled into a thermal inkjet pen/cartridge (Hewlett-Packard HP38 pens), and were continuously fired on a pen/cartridge life test apparatus for the life of the pen/cartridge. For this test, no media was used. Rather, the pen/cartridge life test apparatus exercised the pen/cartridge, and the magenta ink drops were ejected into a spittoon. At certain intervals and at the end of the pen/cartridge life (1 billion drops per nozzle), the pen/cartridge drop velocity and drop weight were monitored. Table 4 illustrates the % change in drop velocity and the % change in drop weight at the end of the pen/cartridge life in the ambient.

TABLE 4

% Change in Drop Velocity and Drop Weight

| Formulation | Ambient % Change in Drop Weight @ 1 billion drops | Ambient % Change in Drop Velocity @ 1 billion drops |
|---|---|---|
| Comp. Magenta Sample | −22 | −37 |
| Magenta Ink Sample 1 | −6 | −12 |
| Magenta Ink Sample 2 | −6 | −10 |
| Magenta Ink Sample 3 | −5 | −14 |

Based upon the drop velocity data and the drop weight data taken immediately after the test was performed, magenta ink samples 1-3 (containing, respectively, 0.055 wt % of diethylenetriaminepentaacetic acid, 0.075 wt % diethylenetriaminepentaacetic acid, and 0.055 wt % of N,N'-1,3-propanediylbis[N-(carboxymethyl)-glycine) were desirable and effectively reduced kogation. Magenta ink samples 1-3 each exhibited a desirable equal to or less than 15% change in both drop velocity and drop weight, with the change in drop weight values being particularly low. The same data collected for the comparative magenta ink sample indicated that the comparative sample was undesirable. Overall, the data illustrates that a chelating agent having two or more nitrogen atoms and four or more carboxylic acid (or carboxylate salt) functional groups is suitable for reducing kogation of magenta inks over the life of the pen/cartridge, and is more effective than a similar magenta ink composition that does not include such a chelating agent.

The results of Example 2 also illustrated that an ethoxylated glycerol (e.g., LIPONIC™ EG-1) was not as effective in preventing kogation when compared to the example ink compositions including chelating agents having two or more nitrogen atoms and four or more carboxylic acid (or carboxylate salt) functional groups, but not including ethoxylated glycerol.

EXAMPLE 3

Magenta colored ink compositions were prepared with N,N'-1,3-propanediylbis[N-(carboxymethyl)-glycine, diethylenetriaminepentaacetic acid, or 4,5-dihydroxy-1,3-benzenedisulfonic acid, disodium salt as the selected chelating agent. A comparative magenta ink composition was prepared without any of the chelating agents. The formulations of the sample magenta ink compositions and the comparative magenta ink composition are shown in Table 5.

TABLE 5

Magenta Ink Composition Formulations

| Component | Comp. Magenta Sample 2 Wt % | Magenta Sample 4 Wt % | Magenta Sample 5 Wt % | Magenta Sample 6 Wt % |
|---|---|---|---|---|
| N,N'-1,3-propanediylbis[N-(carboxymethyl)-glycine | None | 0.10 | None | None |
| diethylenetriaminepentaacetic acid | None | None | 0.10 | None |
| 4,5-dihydroxy-1,3-benzenedisulfonic acid, disodium salt | None | None | None | 0.10 |
| di-(2-hydroxyethyl)-5,5-dimethylhydantoin | 4.00 | 4.00 | 4.00 | 4.00 |
| 2-pyrrollidinone | 7.50 | 7.50 | 7.50 | 7.50 |
| Triethylene glycol | 10.00 | 10.00 | 10.00 | 10.00 |
| Dodecyl-2-pyrrolidone | 0.10 | 0.10 | 0.10 | 0.10 |
| SURFYNOL ® 440 (Air Products and Chemicals, Inc.) | 0.30 | 0.30 | 0.30 | 0.30 |
| Polyurethane binder | 0.75 | 0.75 | 0.75 | 0.75 |
| Magenta Pigment Styrene Acrylate Dispersion | 4.20 | 4.20 | 4.20 | 4.20 |
| PROXEL ™ GXL (The Dow Chemical Co.) | 0.10 | 0.10 | 0.10 | 0.10 |
| KORDEK ™ MLX (The Dow Chemical Co.) | 0.14 | 0.14 | 0.14 | 0.14 |
| Water | Balance to 100 wt % | Balance to 100 wt % | Balance to 100 wt % | Balance to 100 wt % |
| pH (adjusted with KOH) | 9.3 | 9.3 | 9.3 | 9.3 |

Each of the comparative magenta ink sample 2 and magenta ink samples 4-6 were filled into a thermal inkjet pen/cartridge (Hewlett-Packard HP940 pens), and were continuously fired on a pen/cartridge life test apparatus for the life of the pen/cartridge. The pen/cartridge drop velocity and drop weight were monitored over 350 million drops per nozzle. Table 6 illustrates the % change in drop velocity and the % change in drop weight at 350 million drops.

TABLE 6

% Change in Drop Velocity and Drop Weight

| Formulation | % Change in Drop Velocity @ 350 million drops | % Change in Drop Weight @ 350 million drops |
|---|---|---|
| Comp. Magenta Sample 2 | −18.9 | −16.3 |
| Magenta Ink Sample 4 | −9.9 | −14.4 |
| Magenta Ink Sample 5 | −11.7 | −16.1 |
| Magenta Ink Sample 6 | −3.9 | −7.4 |

Comparative magenta sample 2 and magenta ink samples 4-6 each provided desirable results. However, when the changes in drop velocity are compared, magenta ink samples 4-6 exhibited a change in drop velocity that was at least 7% less than the drop velocity exhibited by comparative magenta sample 2. Magenta ink samples 4-6 (in particular magenta ink sample 6) also exhibited an improved drop weight change compared to comparative magenta ink sample 2.

Overall, the data illustrates that a chelating agent having two or more nitrogen atoms and four or more carboxylic acid (or carboxylate salt) functional groups or a chelating agent that is a catechol having sulfonate functional group(s) is suitable for reducing kogation of magenta inks over the life of the pen/cartridge, and is more effective than a similar magenta ink composition that does not include such chelating agents.

EXAMPLE 4

Yellow colored ink compositions were prepared with N,N'-1,3-propanediylbis[N-(carboxymethyl)-glycine or 4,5-dihydroxy-1,3-benzenedisulfonic acid, disodium salt as the selected chelating agent. Two comparative yellow ink compositions were prepared without any of the chelating agents. The formulations of the sample yellow ink compositions and the comparative yellow ink compositions are shown in Table 7.

TABLE 7

Yellow Ink Composition Formulations

| Component | Comp. Yellow Sample 1 Wt % | Yellow Sample 1 Wt % | Comp. Yellow Sample 2 Wt % | Yellow Sample 2 Wt % |
|---|---|---|---|---|
| N,N'-1,3-propanediylbis [N-(carboxymethyl)-glycine | None | 0.05 | None | None |
| 4,5-dihydroxy-1,3-benzenedisulfonic acid, disodium salt | None | None | None | 0.05 |
| di-(2-hydroxyethyl)-5,5-dimethylhydantoin | 8.00 | 8.00 | None | None |
| 2-hydroxyethyl-2-pyrrollidinone | 1.50 | 1.50 | None | None |
| Tripropylene glycol | None | None | 10.00 | 10.00 |
| Tetraethylene glycol | None | None | 5.00 | 5.00 |
| CRODAFOS ™ N3, acid form (Croda, Inc.) | 0.75 | 0.75 | 1.00 | 1.00 |
| SURFYNOL ® SE-F (Air Products and Chemicals, Inc.) | 0.65 | 0.65 | 0.65 | 0.65 |
| Polyurethane binder | 1.00 | 1.00 | None | None |
| Yellow Pigment Styrene Acrylate Dispersion | 4.00 | 4.00 | 4.00 | 4.00 |
| PROXEL ™ GXL (The Dow Chemical Co.) | 0.18 | 0.18 | 0.18 | 0.18 |
| KORDEK ™ MLX (The Dow Chemical Co.) | 0.14 | 0.14 | 0.14 | 0.14 |
| Water | Balance to 100 wt % | Balance to 100 wt % | Balance to 100 wt % | Balance to 100 wt % |
| pH (adjusted with KOH) | 9.2 | 9.2 | 9.2 | 9.2 |

Each of comparative yellow ink samples 1 and 2 and yellow ink samples 1 and 2 were filled into a thermal inkjet pen/cartridge (Hewlett-Packard HP38 pens), and were continuously fired on a pen/cartridge life test apparatus for the life of the pen/cartridge. For this test, no media was used. Rather, the pen/cartridge life test apparatus exercised the pen/cartridge, and the yellow ink drops were ejected into a spittoon. At certain intervals and at the end of the pen/cartridge life (1 billion drops per nozzle), the pen/cartridge drop velocity and drop weight were monitored. Table 8 illustrates the % change in drop velocity and the % change in drop weight at the end of the pen/cartridge life.

TABLE 8

% Change in Drop Velocity and Drop Weight

| Formulation | % Change in Drop Velocity @ 1 billion drops | % Change in Drop Weight @ 1 billion drops |
|---|---|---|
| Comp. Yellow Sample 1 | −25.5 | −11 |
| Yellow Ink Sample 1 | −15.5 | −7 |
| Comp. Yellow Sample 2 | −39.3 | −21 |
| Yellow Ink Sample 2 | −5.4 | −4 |

Comparative yellow sample 1 exhibited poor results because the % change in drop velocity was over 20%. In contrast, yellow ink sample 1 exhibited desirable kogation results. In particular, yellow ink sample 1 (containing N,N'-1,3-propanediylbis[N-(carboxymethyl)-glycine) exhibited an improved % drop velocity change and an improved % weight change compared to comparative yellow sample 1.

Comparative yellow sample 2 also exhibited poor results because the % change in drop velocity was over 20%. In contrast, yellow ink sample 2 exhibited desirable kogation results. In particular, yellow ink sample 2 (containing 4,5-dihydroxy-1,3-benzenedisulfonic acid, disodium salt) exhibited an improved % drop velocity change and an improved % weight change compared to comparative yellow sample 2.

Overall, the data illustrates that a chelating agent having two or more nitrogen atoms and four or more carboxylic acid (or carboxylate salt) functional groups or a chelating agent that is a catechol having sulfonate functional group(s) is suitable for reducing kogation of yellow inks over the life of the pen/cartridge, and is more effective than a similar yellow ink composition that does not include such chelating agents.

Decap performance was also tested for yellow ink samples 1 and 2 and comparative yellow ink samples 1 and 2 using a Hewlett-Packard CM8050 Edgeline printer modified to print with a Hewlett-Packard HP38 pen. To test decap, the print cartridge was left out of the capping station for a known period of time. At the end of the time interval, the pen was printed to evaluate the nozzle health. The data indicated that the decap performance of inks including one of the chelating agents was better than the decap performance of the comparative yellow ink samples prepared without the chelating agents.

It is to be understood that the ranges provided herein include the stated range and any value or sub-range within the stated range. For example, a range from about 5 wt % to about 25 wt % should be interpreted to include not only the explicitly recited limits of about 5 wt % to about 25 wt %, but also to include individual values, such as 9.5 wt %, 15 wt %, 21.6 wt %, etc., and sub-ranges, such as from about 9.5 wt % to about 15 wt %, from about 10 wt % to about 22 wt %, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:

1. A colored ink composition, comprising:
from about 5 wt % to about 25 wt % of a co-solvent;
from about 0.5 wt % to about 6 wt % of a colorant;
from about 0.025 wt % to about 0.055 wt % of i) a chelating agent represented by formula 1:

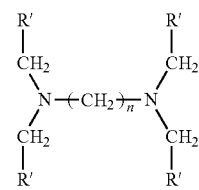

wherein R' is a carboxylic acid functional group or a carboxylate salt functional group and n>2; ii) a cheating agent represented by formula 2:

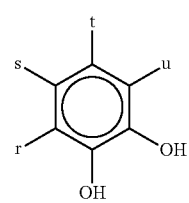

wherein any of r, s, t, or u is a sulfonic acid functional group or a sulfonate functional group; or iii) a combination of i and ii; and
  a balance of water.
2. The colored ink composition as defined in claim 1 wherein the colored ink composition includes the chelating agent represented by formula 1 and the chelating agent represented by formula 1 is N,N'-1,3-propanediylbis [N-(carboxymethyl)-glycine].
3. The colored ink composition as defined in claim 1 wherein the colored ink composition includes the chelating agent represented by formula 2 and the chelating agent represented by formula 2 is 4,5-dihydroxy-1,3-benzenedisulfonic acid, disodium salt.
4. The colored ink composition as defined in claim 1, further comprising:
  from about 0.1 wt % to about 2 wt % of a non-ionic surfactant; and
  from about 0.05 wt % to about 0.5 wt % of a biocide.
5. The colored ink composition as defined in claim 4, further comprising at least one of:
  from greater than 0 wt % to about 3.0 wt % of a polyurethane binder;
  from greater than 0 wt % to about 1.0 wt % of an ethoxylated glycerol; or
  from greater than 0 wt % to about 1.0 wt % of an alkyl phosphate ester.
6. The colored ink composition as defined in claim 1 wherein the co-solvent includes di-(2-hydroxyethyl)-5,5-dimethylhydantoin; 2-hydroxyethyl-2-pyrrollidinone; 2-pyrrollidinone; triethylene glycol; glycerol polyoxyethyl ether; tripropylene glycol; tetraethylene glycol; 1-(2-hydroxyethyl)-2-imidazolidinone; 1,2,6-hexanetriol; trimethylolpropane; glycerol; 2-hydroxyethyl-2-methyl-1,3-propanediol; or combinations thereof.
7. The colored ink composition as defined in claim 1 wherein a pH of the ink composition ranges from over 7 to 12.
8. The colored ink composition as defined in claim 1, further comprising from greater than 0 wt % to about 3.0 wt % of a polyurethane binder, wherein the polyurethane binder has an acid number ranging from 20 to 59.
9. The colored ink composition as defined in claim 1, further comprising from greater than 0 wt % to about 3.0 wt % of a polyurethane binder, wherein the polyurethane binder has a weight average molecular weight ranging from about 20000 to about 50000.
10. An ink cartridge, comprising:
  a fluid reservoir;
  a fluid ejector in fluid communication with the fluid reservoir; and
  the colored ink composition as defined in claim 1 present in the fluid reservoir.
11. The ink cartridge as defined in claim 10 wherein at least one of:
  the colored ink composition includes the chelating agent represented by formula 1 and the chelating agent represented by formula 1 is N,N'-1,3-propanediylbis[N-(carboxymethyl)-glycine]; or
  the colored ink composition includes the chelating agent represented by formula 2 and the chelating agent represented by formula 2 is 4,5-dihydroxy-1,3-benzenedisulfonic acid, disodium salt.
12. The ink cartridge as defined in claim 11 wherein:
  the colored ink composition includes from about 0.05 wt % to about 0.055 wt % of the N,N'-1,3-propanediylbis[N-(carboxymethyl)-glycine] or the 4,5-dihydroxy-1,3-benzenedisulfonic acid, disodium salt; and
  the colored ink composition further includes:
    from about 0.5 wt % to about 6 wt % of a colored pigment dispersion;
    from about 0.1 wt % to about 2 wt % of a non-ionic surfactant;
    from about 0.05 wt % to about 0.5 wt % of a biocide;
    up to about 3.0 wt % of a polyurethane binder;
    up to about 1.0 wt % of an ethoxylated glycerol; and
    up to about 1.0 wt % of an alkyl phosphate ester.
13. A method for improving kogation of a colored ink composition, the method comprising:
  selecting i) a chelating agent represented by formula 1:

$$\begin{array}{c} R' \\ | \\ CH_2 \\ \diagdown \\ N-(CH_2)_n-N \\ \diagup \\ CH_2 \\ | \\ R' \end{array} \quad \begin{array}{c} R' \\ | \\ CH_2 \\ \\ \\ CH_2 \\ | \\ R' \end{array}$$

wherein R' is a carboxylic acid functional group or a carboxylate salt functional group and n>2; ii) a chelating agent represented by formula 2:

[benzene ring with substituents r, s, t, u and two OH groups]

wherein any of r, s, t, or u is a sulfonic acid functional group or a sulfonate functional group; or iii) a combination of i and ii; and
  incorporating from about 0.025 wt % to about 0.055 wt % of the selected chelating agent into a solution including:
    from about 5 wt % to about 25 wt % of a co-solvent;
    from about 0.5 wt % to about 6 wt % of a colorant; and
    a balance of water.
14. An ink composition, comprising:
  from about 5 wt% to about 25 wt % of a co-solvent;
  from about 0.5 wt% to about 6 wt % of a colorant;
  from greater than 0 wt % to about 3.0 wt % of a polyurethane binder, wherein the polyurethane binder has an acid number ranging from 20 to 59, and a weight average molecular weight ranging from about 20000 to about 50000;
  from about 0.025 wt % to about 0.2 wt % of i) a chelating agent represented by formula 1:

$$\begin{array}{c} R' \\ | \\ CH_2 \\ \diagdown \\ N-(CH_2)_n-N \\ \diagup \\ CH_2 \\ | \\ R' \end{array} \quad \begin{array}{c} R' \\ | \\ CH_2 \\ \\ \\ CH_2 \\ | \\ R' \end{array}$$

wherein R' is a carboxylic acid functional group or a carboxylate salt functional group and n>2; ii) a chelating agent represented by formula 2:

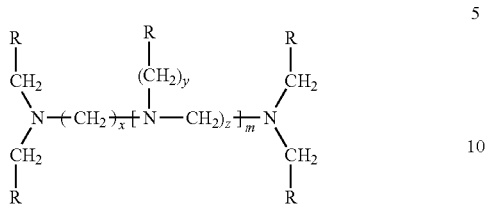

wherein R is a carboxylic acid functional group or a carboxylate salt functional group, m≥1, x≥2, y≥1, and z≥2; iii) a chelating agent represented by formula 3:

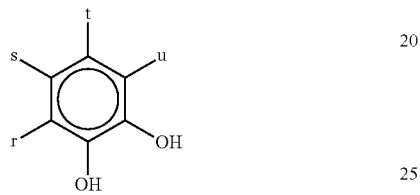

wherein any of r, s, t, or u is a sulfonic acid functional group or a sulfonate functional group; or iv) combinations of any of i, ii, and iii; and
a balance of water.

* * * * *

UNITED STATES PATENT AND TRADEMARK OFFICE
CERTIFICATE OF CORRECTION

PATENT NO. : 9,637,654 B2  
APPLICATION NO. : 14/349048  
DATED : May 2, 2017  
INVENTOR(S) : Keshava A. Prasad et al.

Page 1 of 1

It is certified that error appears in the above-identified patent and that said Letters Patent is hereby corrected as shown below:

In the Claims

In Column 12, Line 55, in Claim 1, delete "cheating" and insert -- chelating --, therefor.

In Column 13, Line 31, in Claim 6, delete "2-pyrrollidinone;" and insert -- 2-pyrrolidinone; --, therefor.

In Column 13, Line 32, in Claim 6, delete "2-pyrrollidinone;" and insert -- 2-pyrrolidinone; --, therefor.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*